(No Model.)
J. HOFFACKER.
Clothes Pin.
No. 237,976.        Patented Feb. 22, 1881.
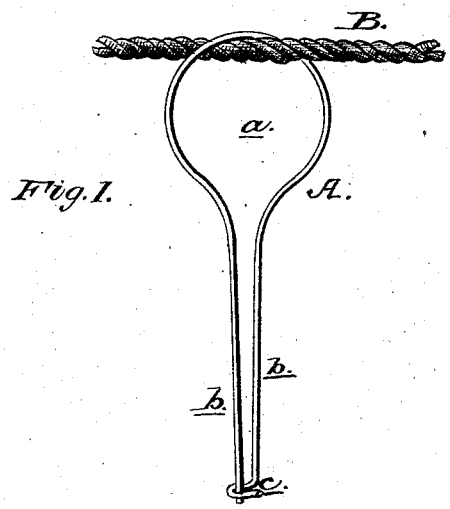
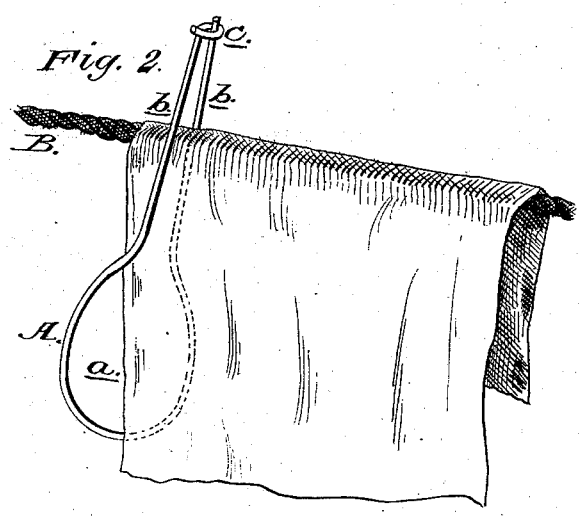

UNITED STATES PATENT OFFICE.

JOHN HOFFACKER, OF NEW CASTLE, INDIANA, ASSIGNOR OF TWO-THIRDS TO WILLIAM H. ELLIOTT, OF SAME PLACE.

CLOTHES-PIN.

SPECIFICATION forming part of Letters Patent No. 237,976, dated February 22, 1881.

Application filed June 26, 1880. (No model.)

*To all whom it may concern:*

Be it known that I, JOHN HOFFACKER, of New Castle, in the county of Henry and State of Indiana, have invented certain new and useful Improvements in Clothes-Pins; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention has for its object to provide an improved construction of clothes-pins, whereby the same may be permanently connected to a clothes-line and adapted to be moved from one point to another upon the same to secure thereto articles of clothing from the wash, all as will be hereinafter more fully described, and pointed out in the claims.

In the drawings, Figure 1 is a perspective view of my invention applied to a clothes-line, and Fig. 2 is a similar view of the same when in operation.

Similar letters of reference occurring on the several figures indicate like parts.

Referring to the drawings, A represents the complete clothes-line pin, which is preferably formed of stout wire bent in such a manner as to form a loop, $a$, at the top, and the loose ends or legs $b$ of which are connected together at the bottom by forming a ring, $c$, upon the end of one leg, through which the other leg passes, as fully shown in the drawings.

The invention, as thus constructed, is adapted for use by passing the clothes-line B through the loop portion $a$ of the clothes-pins, and when the line B is stretched in proper position the pins A hang by the loop $a$, as shown in Fig. 1. In stretching clothes to be dried upon the line B the pins A are moved in close proximity to the same, and the end of the article to be attached to the line is lapped over the line and the pin A reversed, bringing the ends of the goods between the legs of the clothes-pin and securely attaching the same to the line, as fully shown in Fig. 2.

It will be observed that by means of my invention the pins are always ready for use and at any desired point upon the line, and which, being attached thereto, are not liable to become mislaid or lost, as is the case with the ordinary clothes-pin.

It will also be observed that when the clothes-line is taken down and rolled up the pins may be allowed to remain thereon, ready for use at any time when the line is stretched again.

I am aware that clothes-pins constructed of wire, with the ends thereof bent together and united by a lead ball and adapted to be hung upon a clothes-line, is not new, such being shown in the patent granted to P. Mutter under date of July 7, 1874, and numbered 152,762, and I do not, therefore, desire to claim such a construction, broadly; but What I do claim as new and useful is—

As an improved article of manufacture, a clothes-pin formed of a single piece of wire bent so as to provide a loop portion, $a$, and spring ends $b$, the one end of which is straight and adapted to pass through a ring, $c$, on the opposite end, substantially as and for the purpose specified.

In testimony that I claim the foregoing as my own I affix my signature in presence of two witnesses.

JOHN HOFFACKER.

Witnesses:
S. H. BROWN,
C. S. HERNLY.